(12) United States Patent
Straub, Jr.

(10) Patent No.: US 7,885,790 B2
(45) Date of Patent: Feb. 8, 2011

(54) METHOD AND SYSTEM OF DETERMINING FORTHCOMING FAILURE OF TRANSDUCERS

(75) Inventor: Henry Charles Straub, Jr., Sugar Land, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 332 days.

(21) Appl. No.: 12/051,126

(22) Filed: Mar. 19, 2008

(65) Prior Publication Data

US 2009/0240453 A1 Sep. 24, 2009

(51) Int. Cl.
G06F 16/00 (2006.01)
G06F 11/00 (2006.01)
(52) U.S. Cl. .................. 702/182; 702/183; 702/184; 702/188
(58) Field of Classification Search ............ 702/45–56, 702/182–188
See application file for complete search history.

(56) References Cited

U.S. PATENT DOCUMENTS 5,684,406 A * 11/1997 MacLauchlan et al. ...... 324/700
6,843,137 B2 * 1/2005 Keech ..................... 73/861.17
7,272,073 B2 * 9/2007 Pellegrini et al. ........... 367/124
2006/0191341 A1 * 8/2006 Olesen et al. ................. 73/592

OTHER PUBLICATIONS

PCT International Search Report and Written Opinion for International Application No. PCT/US2009/036264 filed Mar. 6, 2009.
John Lansing, How Today's USM Diagnostics Solve Metering Problems, North Sea Flow Measurement Workshop 2005, pp. 69-84.

* cited by examiner

*Primary Examiner*—Andrew Schechter
*Assistant Examiner*—Phuong Huynh
(74) *Attorney, Agent, or Firm*—Mark E. Scott; Conley Rose, P.C.

(57) ABSTRACT

A method and system of determining forthcoming failure of transducers. At least some of the illustrative embodiments are methods comprising creating a first electrical signal representative of acoustic energy propagating between a first pair of transducers of a fluid meter, creating a second electrical signal representative of acoustic energy propagating between a second pair of transducers of the fluid meter (the creating the second electrical signal substantially concurrently with create the first electrical signal), calculating a value indicative of a relationship between a parameter of the first electrical signal a parameter of the second electrical signal, and determining whether performance of the first pair of transducers indicates upcoming failure of at least one transducer of the first pair of transducers, the determining using the value.

29 Claims, 5 Drawing Sheets

METHOD AND SYSTEM OF DETERMINING FORTHCOMING FAILURE OF TRANSDUCERS

CROSS REFERENCE TO RELATED APPLICATIONS

None.

BACKGROUND

After hydrocarbons have been removed from the ground, the fluid stream (such as crude or natural gas) is transported from place-to-place via pipelines. It is desirable to know with accuracy the amount of fluid flowing in the stream, and particular accuracy is demanded when the fluid is changing hands, or "custody transfer." Ultrasonic flow meters may be used to measure the amount of fluid flowing in a pipeline, and ultrasonic flow meters have sufficient accuracy to be used in custody transfer.

In an ultrasonic flow meter, acoustic signals are sent back and forth across the fluid stream to be measured. In fact, many ultrasonic meters have multiple transducer pairs, each transducer of a transducer pair both sending acoustic signals and receiving acoustic energy. While in some situations one or both transducers of a transducer pair may cease to operate instantly, in most cases failure of a transducer is over time, with the performance of the transducer (and therefore the pair of transducers considered together) degrading until insufficient information can be gleaned from the transducer pair. For example, signal-to-noise ratio of electrical signals created in response to acoustic energy incident on a transducer may decrease as performance degrades for a transducer.

Environmental factors also affect performance of transducers even in situations where a transducer pair is operating properly. In an illustrative case of signal-to-noise ratio, environmental factors such as pressure of the fluid in a meter, type of fluid in the meter, position of the valve member of upstream control valves, and condition of an upstream flow straightners all affect signal-to-noise ratio. When performance degradation is noted over a course of days, weeks or months, it may be difficult to determine whether the performance degradation is attributable to forthcoming failure of transducers, or changes in environmental factors.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, meter manufacturing companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection, or through an indirect connection via other devices and connections.

"Failure" in reference to a transducer or transducer pair shall mean either the transition to complete inoperability, or degradation in performance to a point where, though operable, the transducer or transducer pair provide insufficient acoustic signal generation and/or reception to be useful in an ultrasonic flow meter.

DETAILED DESCRIPTION

The various embodiments were developed in the context of a four path or four "chord" ultrasonic flow meter, and the description is based in part on the developmental context. However, the systems and methods described may be used for, and within, any multi-path acoustic-type flow meter, and thus the developmental context and description should not be construed to limit the breadth to just four chord ultrasonic flow meters.

The various embodiments are directed to methods and systems of determining whether performance of a pair of transducers indicates upcoming failure. The determination is based on parameters of generated and received acoustic energy among at least two pairs of transducers, the acoustic energy received by respective transducers substantially concurrently (e.g., within the same measurement period). Stated otherwise, the parameters used to make the determination are from acoustic signals created by, and acoustic energy received on, different transducer pairs in the same measurement period (e.g., within one second), in some cases within milliseconds of each other. Basing the determination on acoustic energy received substantially concurrently, the methods and systems obviate the need to maintain historical performance values and reduce, if not eliminate, the effects of environmental factors on apparent transducer performance. Before turning more specifically to the various embodiments, the specification discusses an illustrative ultrasonic flow meter within which the various embodiments may operate.

Figure 1A:
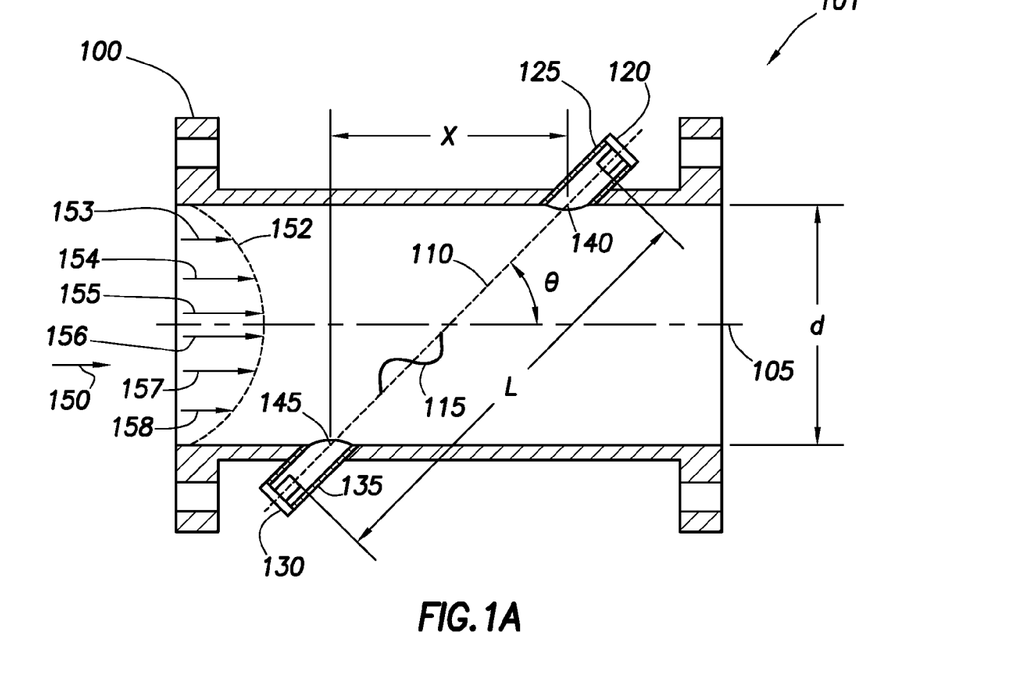
FIG. 1A shows a cross-section elevation view of a flow meter in accordance with at least some embodiments.

FIG. 1A shows an ultrasonic flow meter 101 in order to explain the various components and relationships of an ultrasonic flow meter. Spool piece 100, suitable for placement between sections of a pipeline, has a predetermined size and defines a central passage through which a measured fluid flows. An illustrative pair of transducers 120 and 130, and their respective housings 125 and 135, are located along the length of spool piece 100. Transducers 120 and 130 are acoustic transceivers, and more particularly ultrasonic transceivers, meaning that they both generate and receive acoustic energy having frequencies of above about 20 kilohertz. The acoustic energy may be generated and received by a piezoelectric element in each transducer. To generate an acoustic signal, the piezoelectric element is stimulated electrically by way of a sinusoidal signal, and it responds by vibrating. The vibration of the piezoelectric element generates the acoustic signal that travels through the measured fluid to the corresponding transducer of the transducer pair. Similarly, upon being struck by acoustic energy (i.e., the acoustic signal and other noise signals), the receiving piezoelectric element vibrates and generates a sinusoidal electrical signal that is detected, digitized, and analyzed by electronics associated with the meter.

A path 110, sometimes referred to as a "chord," exists between illustrative transducers 120 and 130 at an angle θ to a centerline 105. The length of "chord" 110 is the distance between the face of transducer 120 and the face of transducer 130. Points 140 and 145 define the locations where acoustic signals generated by transducers 120 and 130 enter and leave fluid flowing through the spool piece 100 (i.e., the entrance to the spool piece bore). The position of transducers 120 and 130 may be defined by the angle θ, by a first length L measured between transducers 120 and 130, a second length X corresponding to the axial distance between points 140 and 145, and a third length "d" corresponding to the pipe inside diameter. In most cases distances d, X and L are precisely determined during meter fabrication. Further, transducers such as 120 and 130 are usually placed a specific distance from points 140 and 145, respectively, regardless of meter size (i.e., spool piece size). A fluid, such as natural gas, flows in a direction 150 with a velocity profile 152. Velocity vectors 153-158 illustrate that the gas velocity through spool piece 100 increases toward the centerline 105 of the spool piece 100.

Initially, downstream transducer 120 generates an acoustic signal that propagates across the fluid in the spool piece 100, and is then incident upon and detected by upstream transducer 130. A short time later (e.g., within a few milliseconds), the upstream transducer 130 generates a return acoustic signal that propagates back across the fluid in the spool piece 100, and is then incident upon and detected by the downstream transducer 120. Thus, the transducers 120 and 130 play "pitch and catch" with signals 115 along chordal path 110. During operation, this sequence may occur thousands of times per minute.

The transit time of the acoustic signal 115 between transducers 120 and 130 depends in part upon whether the acoustic signal 115 is traveling upstream or downstream with respect to the fluid flow. The transit time for an acoustic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid.

Figure 1B:
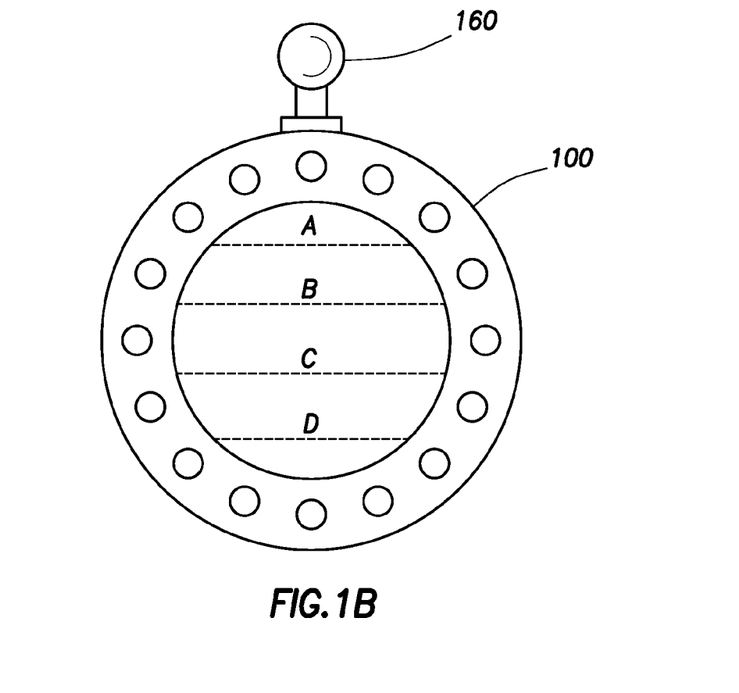
FIG. 1B shows an elevation end-view of a flow meter in accordance with at least some embodiments.

Ultrasonic flow meters can have one or more acoustic signal paths. FIG. 1B illustrates an elevation view of one end a multi-path ultrasonic flow meter. The ultrasonic flow meter of FIG. 1B comprises four chordal paths A, B, C and D at varying levels within the spool piece 100. Each chordal path A-D corresponds to a transducer pair behaving alternately as a transmitter and receiver. Also shown is control electronics enclosure 160, which control electronics acquire and process the data from the four chordal paths A-D. Hidden from view in FIG. 1B are the four pairs of transducers that correspond to chordal paths A-D.

Figure 1C:
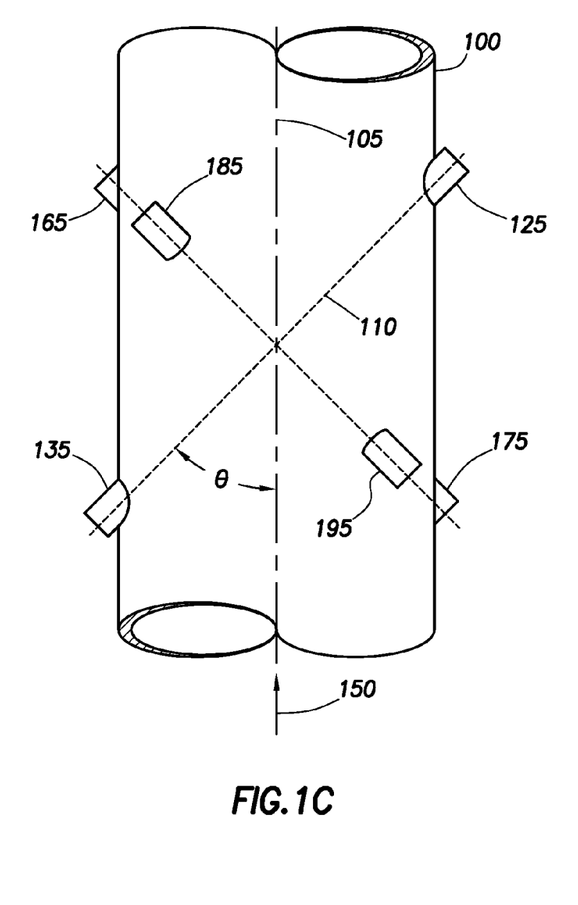
FIG. 1C shows an overhead view of a flow meter in accordance with at least some embodiments.

The arrangement of the four pairs of transducers may be more easily understood by reference to FIG. 1C. Four pairs of transducer ports are mounted on spool piece 100. Each pair of transducer ports corresponds to a single chordal path of FIG. 1B. A first pair of transducer ports 125 and 135 comprises transducers 120 and 130 (FIG. 1A). The transducers are mounted at a non-perpendicular angle θ to centerline 105 of spool piece 100. Another pair of transducer ports 165 and 175 (only partially in view) and associated transducers is mounted so that its chordal path loosely forms the shape of an "X" with respect to the chordal path of transducer ports 125 and 135. Similarly, transducer ports 185 and 195 are placed parallel to transducer ports 165 and 175 but at a different "level" (i.e., a different radial position in the pipe or meter spool piece). Not explicitly shown in FIG. 1C is a fourth pair of transducers and transducer ports. Taking FIGS. 1B and 1C together, the pairs of transducers are arranged such that the upper two pairs of transducers corresponding to chords A and B form an the shape of an "X", and the lower two pairs of transducers corresponding to chords C and D also form the shape of an "X". The flow velocity of the fluid may be determined at each chord A-D to obtain chordal flow velocities, and the chordal flow velocities combined to determine an average flow velocity over the entire pipe. From the average flow velocity, the amount of fluid flowing in the spool piece, and thus the pipeline, may be determined.

Figure 2:
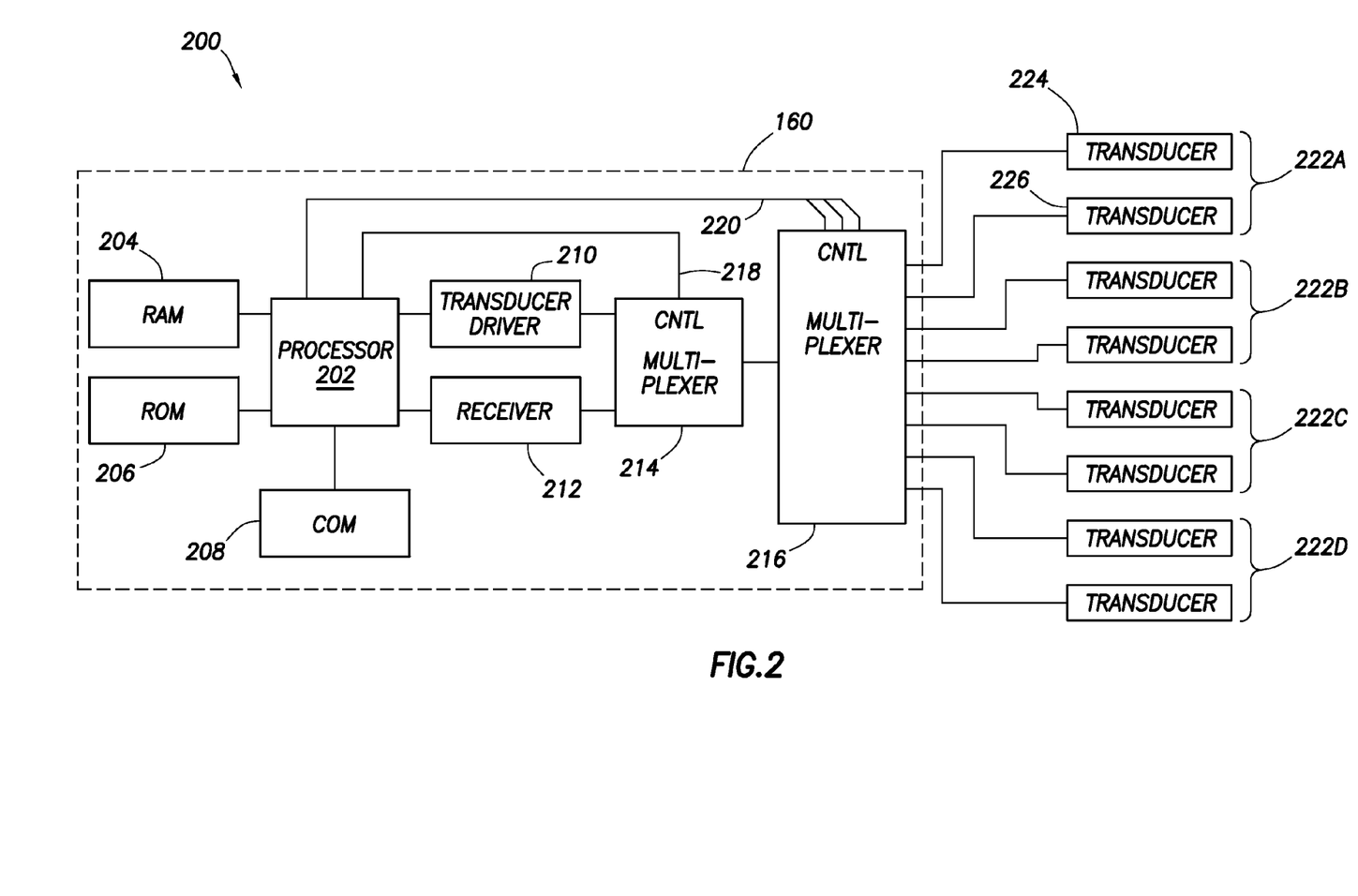
FIG. 2 shows electronics of a flow meter in accordance with at least some embodiments.

FIG. 2 illustrates control electronics 200 of an ultrasonic flow meter in accordance with at least some embodiments. The control electronics 200 may reside with the electronics enclosure 160 of FIG. 1B, which electronics enclosure 160 may couple to the spool piece 100. Alternatively, the electronics enclosure 160 may be equivalently mounted proximate (i.e., within a few feet) of the spool piece. The control electronics 200 comprise a processor 202 coupled to a random access memory (RAM) 204, read only memory (ROM) 206 and communication port (COM) 208. The processor 202 is the device within which programs execute to perform the tasks of the various embodiments. The ROM 206 is a non-volatile memory which stores operating system programs, as well as programs to implement the various embodiments. The RAM 204 is the working memory for the processor 202, and before execution some programs and/or data structures may be copied from the ROM 206 to the RAM 204. In alternative embodiments, some programs and data structures may be accessed directly from the ROM 206. The communication port 208 is the mechanism by which the meter communicates with upstream devices, such as flow computers (which may accumulate measured fluid flow from a plurality of fluid meters) and/or a data acquisition system. While the processor 202, RAM 204, ROM 206 and communication port 208 are illustrated as individual devices, in alternative embodiments microcontrollers are used, which microcontrollers integrally comprise a processing core, RAM, ROM and communication ports.

Processor 202 further couples to and controls a plurality of devices in order to send and receive acoustic signals through the measured fluid. In particular, the processor 202 couples to a transducer driver 210, receiver 212, and two multiplexers 214 and 216 by way of control lines 218 and 220, respectively. In some embodiments, the transducer driver 210 comprises an oscillator circuit and an amplifier circuit. The transducer driver 210 in these embodiments creates an initial signal, amplifies the signal to sufficient signal strength to drive a transducer, and provides impedance matching with respect to the transducers. In other embodiments, the transducer driver receives an alternating current (AC) signal of the desired frequency from the processor 202, amplifies the signal and provides impedance matching with respect to the transducers. The receiver 212 likewise may take many forms. In some embodiments, the receiver 212 is an analog-to-digital converter which takes the analog waveform created by a transducer representative of the received acoustic energy, and converts the signal to digital form. In some cases, the receiver 212 may filter and/or amplify the signals prior to or after digitization. The digitized version of the received signal may then pass to the processor 202 for purposes of determining fluid flow, and also for determining whether performance of one or more transducers pairs is degrading (discussed more below).

The processor 202, executing a program, selectively controls the multiplexers 214 and 216 to couple each transducer of each transducer pair 222 to the transducer driver 210 (to drive the transducer to create the acoustic signal) and to the receiver 212 (to receive the electrical signal created by the transducer in response to the acoustic energy). In some embodiments, the processor 202, within the span of a one second measurement period, directs each transducer pair to send approximately 30 upstream acoustic signals and 30 downstream acoustic signals. Greater or fewer sets of upstream and downstream acoustic signals for each transducer pair, and longer or shorter measurement periods, may be equivalently used.

Still referring to FIG. 2, and focusing particularly on transducer pair 222A as representative of all the transducer pairs 222. For purposes of this discussion, transducer 224 is the sending transducer, and transducer 226 is the receiving transducer; however, in actual operation these roles change alternately. Under control of the processor 202, the transducer driver 210 is coupled, through multiplexers 214 and 216, to the transducer 224. An electrical signal generated and/or amplified by the transducer driver 210 propagates to and excites a piezoelectric element in transducer 224, and in turn transducer 224 generates an acoustic signal. The acoustic signal traverses the distance between transducer 224 and transducer 226 in the measured fluid. For convenience of the drawing, the transducer pair 222A of FIG. 2 is not aligned, but in operation the transducer pair would be substantially coaxial, as illustrated in FIG. 1A. During the flight time of the acoustic signal between transducer 224 and transducer 226, the processor 202 changes the configuration of the multiplexers 214 and 216 to couple transducer 226 to the receiver 212. Transducer 226 receives the acoustic energy (i.e., acoustic signal and noise signals), and an electrical signal corresponding to the received acoustic energy propagates to the receiver 212.

Figure 3:
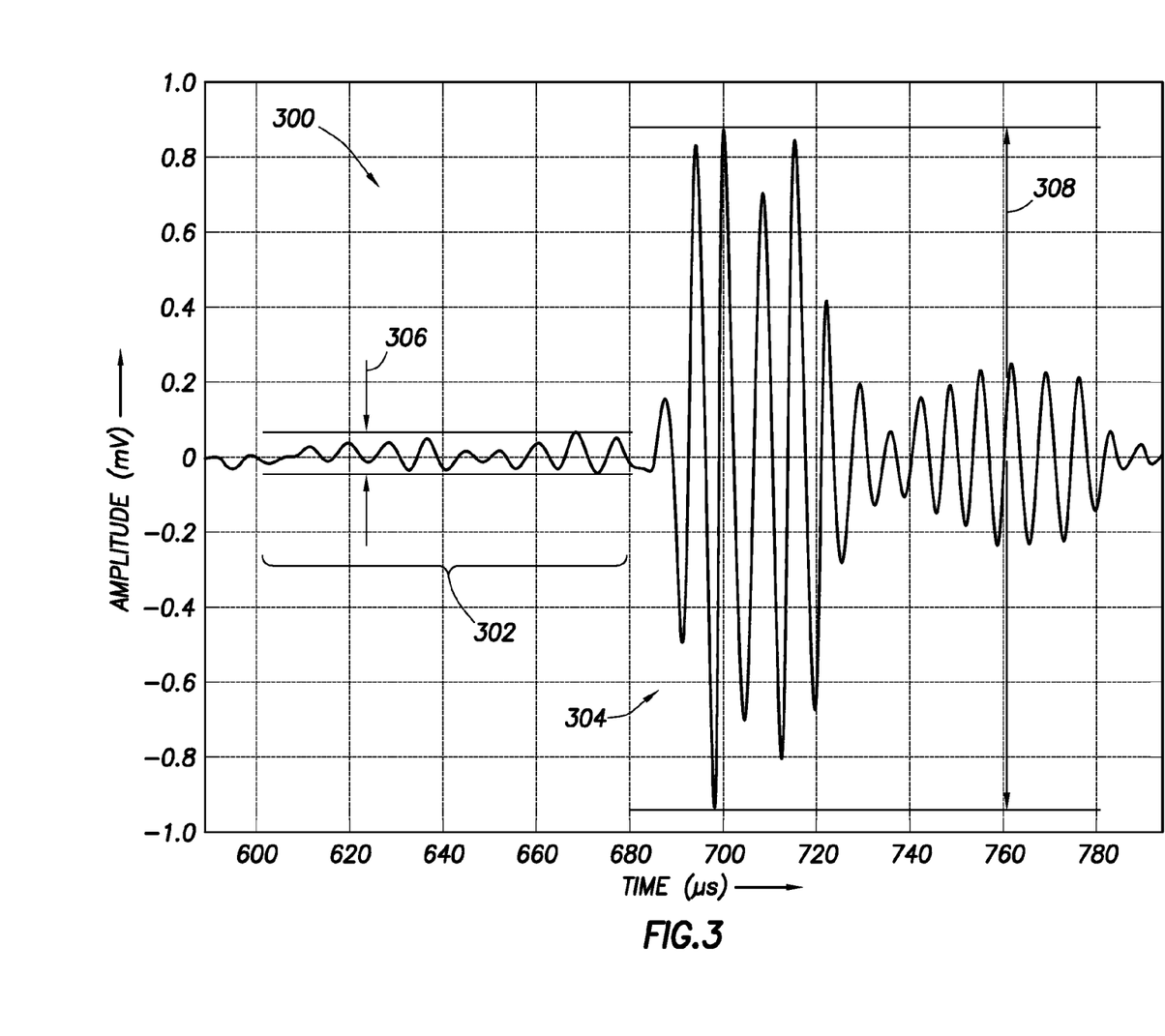
FIG. 3 shows an illustrative electrical signal representative of received acoustic energy.

FIG. 3 illustrates a received signal 300 as a function of time in order to discuss various parameters of interest. In particular, the received signal 300 is illustrative of an electrical signal created by a transducer responsive to acoustic energy within the fluid. Between the period of time when a first transducer of a transducer pair launches an acoustic signal and when the acoustic signal impinges upon the second transducer of the transducer pair, the second transducer generates noise signal 302. Once the acoustic signal impinges on the transducer, the transducer creates a signal 304 whose amplitude and duration is responsive to the amplitude and duration of the acoustic signal generated by the first transducer.

The noise signal 302 may be due in part to stray acoustic energy in the measured fluid, and is also due in part to a the health of the piezoelectric element in the transducer. In particular, a transducer operating properly produces a noise signal 302 having an amplitude 306 proportional to stray acoustic energy in the measured fluid, and also proportional to inherent electrical noise created by the piezoelectric element and system electronics. In some failure modes, the amplitude 306 of noise signal 302 increases with no corresponding increase in stray acoustic energy. In yet other failure modes, the noise amplitude 306 declines with no corresponding decrease in stray acoustic energy.

Still referring to FIG. 3, a transducer operating properly produces a signal 304 having an amplitude 308 proportional to the amplitude of an acoustic signal impinging on the transducer. However, as the health of a transducer receiving acoustic energy diminishes the amplitude 308 of the signal 304 declines with no corresponding decrease in energy of the acoustic signal created by the second transducer of the pair. Likewise, as the health of the transducer producing the acoustic signal diminishes, the amplitude of the acoustic signal launched into the fluid diminishes, and the thus the amplitude 308 of the signal 304 declines. Thus, for a transducer pair, low amplitude 308 of signal 304 may be indicative of impending failure of one or both of the transducers of the pair.

In accordance with at least some embodiments, the health or performance of a transducer pair may be determined by parameters of received acoustic energy from at least two pairs of transducers, the acoustic energy received substantially concurrently (e.g., within the same measurement period). Before discussing the illustrative parameters, the specification turns to timing of sending and receiving signals in an ultrasonic flow meter. Consider, as an example, a four chord ultrasonic flow meter. Within an illustrative measurement period of one second, the ultrasonic meter may send 30 upstream and 30 downstream acoustic signals on each chord (i.e., in a one second measurement period, an acoustic signal is generated, propagated and received every 4.16 milliseconds). Various measurements taken in the measurement period are combined in some way (e.g., upstream transit times for a chord averaged, and downstream transit times for the chord average, and using the average values chrordal flow velocities determined), and then a total flow through meter for the measurement period determined. Having a measurement period of one second is merely illustrative, and measurement periods may be longer or shorter depending on the design characteristics of a particular ultrasonic flow meter; however, measurement periods of more than about two seconds increase the error in total flow calculations, and subject the meter to errors caused by environmental changes (e.g., pressure changes, upstream control valve position change) which adversely affect an ability to test the health of transducer pairs based on parameters of received signals. Thus, for purposes of the specification and the claims, the terms "measurement period", "substantially concurrent" and/or "substantially concurrently" shall mean within two seconds or less.

Further consider, for purposes of discussion, that the ultrasonic flow meter sends the upstream acoustic signal on each chord A-D (FIG. 1B) sequentially (a first half cycle), then downstream acoustic signal on each chord A-D sequentially (a second half cycle), and then the upstream and downstream cycle is repeated 29 more times. With respect to a measurement period being an illustrative one second and a half cycle (upstream on all chords, or downstream on all chords), the difference in time between starting the process with respect to chord A and finishing the process with respect to chord D is approximately 16.67 milliseconds. Within each half cycle, the upstream (receiving) transducer of each transducer pair creates an electrical signal similar signal 300 of FIG. 3, with the actual signal characteristics dependent upon speed of sound at the chordal elevation, speed of the fluid at the chordal elevation, and (importantly for purposes of this specification) the health of the transducers of the transducer pair at the chordal elevation. In order to test the health of a transducer pair, a parameter of the received signal for the tested transducer pair is examined against one or more corresponding parameters of received signals from the other transducers during the measurement period. Many parameters may be used to make the analysis, and an illustrative set of such parameters will be discussed in turn.

The first illustrative parameter is signal-to-noise ratio. Each received signal 300 has corresponding signal-to-noise ratio. In some embodiments, the signal-to-noise ratio may be calculated by dividing the signal 304 amplitude 308 of FIG. 3 by the noise signal 302 amplitude 306. In other embodiments, the signal and noise components of signal 304 may be determined by filtering the signal 304 portion with respect to frequency, and calculating the power content of the signal 304 corresponding to desired signal in proportion to the power content of the noise portion. Regardless of the precise mechanism by which the signal-to-noise ratio is determined for each received signal, a particular chord may be tested for health according to the following equation:

$$\text{Max}(SNR_X) - SNR_{Test} > SNR_{Threshold} \tag{1}$$

where Max is the maximum signal-to-noise ratio of the set $SNR_X$, $SNR_X$ is the signal-to-noise ratio for a chord of the meter (for a four chord meter, X is {A, B, C, D}), $SNR_{Test}$ is the signal-to-noise ratio of the chord being tested, $SNR_{Threshold}$ is a predetermined threshold, and where each SNR is expressed in decibels (dB). Consider, as an example, testing chord A according to equation (1). The highest signal-to-noise ratio of the four chords is selected, and the signal-to-noise ratio for chord A is subtracted therefrom. If the signal-to-noise ratio of chord A is similar to the highest signal-to-noise ratio, the resultant will be small. If chord A has the highest signal-to-noise ratio, the signal-to-noise ratio is subtracted from itself, and the resultant is exactly zero. On the other had, if the signal-to-noise ratio of chord A is significantly smaller, the resultant will be large. A resultant larger than $SNR_{Threshold}$ is indicative of an upcoming failure of chord A. With the same set of received signals (in this illustrative case received in the same half cycle), all the chords of the meter may be tested by equation (1).

The second illustrative parameter is signal amplitude. As discussed with respect to FIG. 3, each signal 304 portion has amplitude 308. Once the signal amplitude of each received signal is determined, a particular chord may be tested for health according to the following equation:

$$\text{Max}(S_X)/S_{Test} > S_{Threshold} \tag{2}$$

where Max is the maximum signal amplitude of the set $S_X$, $S_X$ is the signal amplitude for a chord of the meter (for a four chord meter, X is {A, B, C, D}), $S_{Test}$ is the signal amplitude of the chord being tested, and $S_{Threshold}$ is a predetermined threshold. Consider, as an example, testing chord A according to equation (2). The highest signal amplitude of the illustrative four chords is selected and divided by the signal amplitude for chord A. If the signal amplitude of chord A is similar to the highest signal amplitude, the resultant will be close to unity. If chord A has the highest signal amplitude, the signal amplitude is divided by itself, and the resultant is exactly one. On the other had, if the signal amplitude of chord A is significantly lower than the highest signal amplitude, the resultant will be large. A resultant larger than $S_{Threshold}$ is indicative of an upcoming failure of chord A. With the same set of received signals (in this illustrative case received in the same half cycle), all the chords of the meter may be tested by equation (2).

The third illustrative parameter is noise amplitude. As discussed with respect to FIG. 3, each noise signal 302 has amplitude 306. However, as discussed above there may be two failure modes detectable using noise amplitude, termed here: "fail loud", and "fail deaf". In the fail loud case, the noise signal 302 amplitude 306 increases without a corresponding increase in acoustic energy, and in the fail deaf case the noise signal 302 amplitude 306 decreases without a corresponding decrease in acoustic energy. Once the noise amplitude of each received signal is determined, a particular chord may be tested for health according to the following equation:

$$HN_{Threshold} > \text{Avg}(N_X)/N_{Test} > LN_{Threshold} \tag{3}$$

where Avg is the average noise signal amplitude from the set $N_X$, $N_X$ is the noise signal amplitude for a chord of the meter (for a four chord meter, X is {A, B, C, D}), $N_{Test}$ is the noise signal amplitude of the chord being tested, $HN_{Threshold}$ is high noise predetermined threshold, and $LN_{Threshold}$ is the low noise threshold. Consider, as an example, testing chord A according to equation (3). The average noise signal amplitude of the illustrative four chords is calculated and divided by the noise signal amplitude for chord A. If the noise signal amplitude of chord A is similar to the average noise signal amplitude, the resultant will be close to unity. If the noise signal amplitude of chord A is large as compared to the average noise signal amplitude (i.e., fail loud), the resultant will be small. Finally, if the noise signal amplitude of chord A is small as compared to the average noise signal amplitude (i.e., fail deaf), the resultant will be large.

In some embodiments, a determination as to whether performance of a pair of transducers indicates upcoming failure of at least one transducer of the pair of transducers is made using only one of the above equations. For example, the test based on signal-to-noise ratios may be sufficient to identify performance changes indicating failure. However, in other embodiments a determination of whether performance of a pair of transducers indicates upcoming failure of at least one transducer of the pair of transducers is based on two or more tests. For example, if a tested chord indicates performance changes with respect to one test (e.g., signal-to-noise), the result may be confirmed by performing a test with respect to a second parameter (e.g., signal amplitude or noise amplitude).

The predetermined threshold values $SNR_{Threshold}$, $S_{Threshold}$, $HN_{Threshold}$, and $LN_{Threshold}$ are adjustable, and may be selected based on the expected operating conditions of the meter (e.g., operating pressure, expected flow rates, fluid to be measured). The predetermined thresholds may be selected such that expected variations in transducer performance do not cause the inequalities of equations (1), (2) and/or (3) to be satisfied, but that a change in performance indicative of upcoming failure causes at least one of the inequalities to be satisfied. Tighter predetermined thresholds may lead to earlier detection before forthcoming transducer failure impacts the measurement accuracy, but may also lead to false indications. As an example, the signal-to-noise ratio when all transducer pairs are operating properly may be the same to within about 6 dB. Thus, in some embodiments $SNR_{Threshold}$ may be set in a range of 10 dB to 20 dB. As a further example, the signal amplitudes when all the transducer pairs are operating properly may be the same to better than a factor of three. Thus, in some embodiments $S_{Threshold}$ may be set in a rage of four to eight. What is more, the urgency of replacement of a transducer pair whose performance is degrading may be gleaned from the various parameters. For example, a transducer pair that fails an analysis based on equations (1)-(3) above but has a signal-to-noise ratio (considered individually) above 20 dB may not need replacement as quickly as a transducer pair that fails an analysis based on equations (1)-(3) and has a signal-to-noise ratio below 20 dB which may cause transducer performance to impact measurement accuracy of the meter.

The illustrative embodiments discussed to this point analyze parameters of upstream acoustic signals in the same half cycle. In the case of a measurement period being one second with 30 upstream and 30 downstream operations in the measurement period, the upstream acoustic signals analyzed are all sent and received within a 16.67 milli-second window. However, the pattern of sending chord-sequential upstream, and then chord-sequential downstream, acoustic signals is merely illustrative. The precise pattern of sending upstream and downstream acoustic signals may take many equivalent forms. For example, an ultrasonic flow meter may send, as a set, one upstream acoustic signal and one downstream acoustic signal on chord A, then the set chord B, and so forth through chord D, and then repeat the pattern multiple times in the measurement period. In the case of a measurement period being one second with 30 sets with each set comprising each chord sequentially sending an upstream and downstream acoustic signal, the upstream acoustic signals analyzed are all sent and received within a 33.28 millisecond window. In yet still other embodiments, the upstream acoustic signals analyzed may be in the same measurement period, but need not be from the same cycle. For example, parameters of an upstream acoustic signal near the beginning of the measurement period may be analyzed against upstream acoustic signals in a different cycle near the end of the measurement period. For the illustrative measurement period of one second, the difference in time between when such signals are generated and detected may approach one second.

Further still, while the various embodiments have been discussed in relation to analysis based on upstream acoustic signals, the determination of whether performance of a transducer pair is degrading may likewise be made by analyzing downstream acoustic signals from anywhere within the measurement window. Here again, for the illustrative one second measurement period with 30 upstream and downstream operations in the measurement period, the downstream acoustic signals could be generated and received within a 16.67 milli-second window, within the same 33.28 millisecond window, or at the outer time boundaries of the measurement window.

The illustrative embodiments discussed this point have been based on analysis of parameters of individual received signals (upstream or downstream). However, in other embodiments the analysis may be based on average values over all or part of a measurement period. For example, parameters of the upstream acoustic signals may be averaged over the measurement period, and then a single analysis performed on the average values. In such situations, equations (1)-(3) above are used, except that $SNR_X$ becomes the average signal-to-noise ratio for chord X over the selected period, $SNR_{Test}$ becomes the average signal-to-noise ratio over the selected period of the chord being tested, $S_X$ becomes the average signal amplitude for chord X over the selected period, $S_{Test}$ becomes the average signal amplitude for the selected period of the chord being tested, $N_X$ becomes the average noise signal amplitude for chord X over the selected period, and $N_{Test}$ becomes the average noise signal amplitude for the selected period of the chord being tested. In each case the selected period is less than or equal to the measurement period.

Further still, the illustrative embodiments discussed to this point have been based on signal-to-noise amplitude ratio, signal amplitude and/or noise amplitude. However, other parameters of the received signals may be equivalently analyzed. For example, signal energy (calculated as the square of the signal amplitude) may be used in place of signal amplitude. Likewise, noise energy (calculated as the square of the noise amplitude) may be used in place of noise amplitude. Further still, the signal energy and noise energy may be combined to become an alternative signal-to-noise ratio. Yet still other parameters related to those noted above may also be used. For example, some ultrasonic flow meters use programmable gain amplifiers (i.e., automatic gain control) in the detection portion of the circuitry to provide substantially constant signal amplitude to a zero-crossing detection circuitry. As performance of a transducer pair degenerates, the gain setting of the programmable gain amplifier changes, and thus determining whether performance of the first pair of transducers indicates upcoming failure of at least one transducer of the first pair of transducers may involve calculating a value based on two (or more) gain settings from respective programmable gain amplifiers.

While possible to make the determination in each measurement period of whether performance of a pair of transducers indicates upcoming failure, and even multiple determinations within each measurement period, characteristically transducers fail over a matter of days or weeks. Thus, in some embodiments the determination of whether performance of a pair of transducers indicates upcoming failure is performed a plurality of times each day, once a day, or a plurality of times each week. As noted, however, any determination frequency that is sufficient to identify performance degradation indicative of forthcoming failure may be equivalently used.

Figure 4:
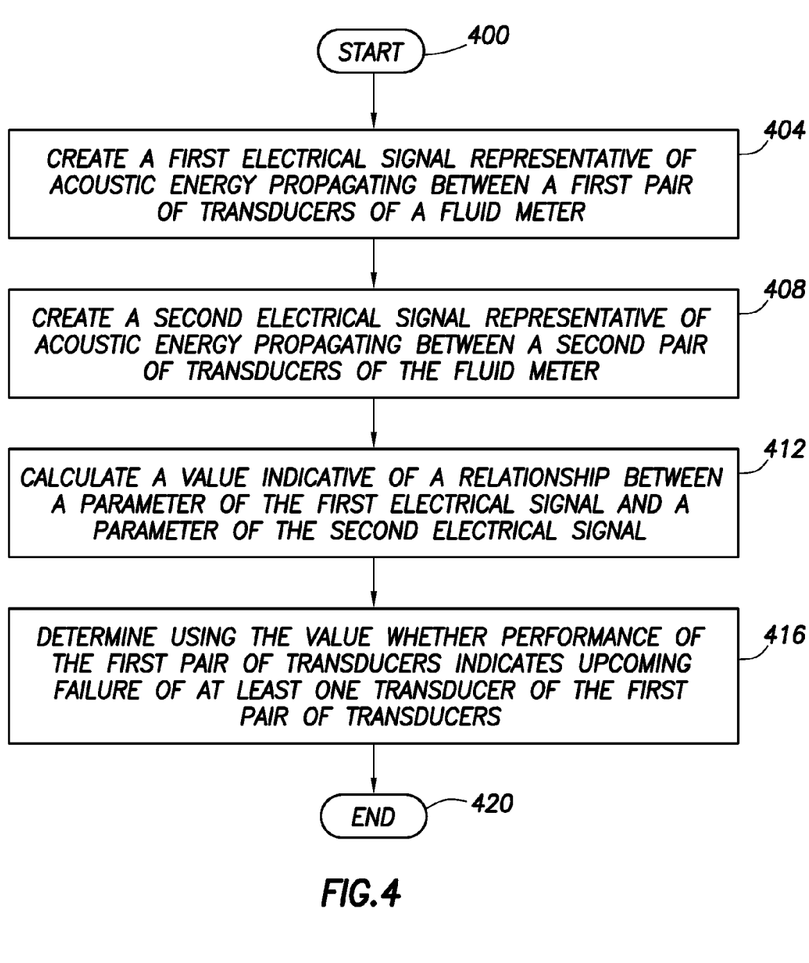
FIG. 4 shows a method in accordance with at least some embodiments.

FIG. 4 illustrates a method in accordance with at least some embodiments. In particular, the method starts (block 400) and proceeds to create a first electrical signal representative of acoustic energy propagating between a first pair of transducers (block 404). Next, a second electrical signal is created, the second electrical signal representative of acoustic energy propagating between a second pair of transducers of the fluid meter (block 408). In some embodiments, the second electrical signal is created substantially concurrently with create the first electrical signal (e.g., within the same measurement period, within 16.67 milliseconds, within 33.28 milliseconds). After creating the electrical signals, the method moves to calculating a value indicative of a relationship between a parameter of the first electrical signal a parameter of the second electrical signal (block 412). As discussed above, the parameters of the electrical signals may be any parameter that can be indicative of health of a transducer pair, such as signal-to-noise ratio, signal amplitude or noise amplitude. Regardless of the parameter selected, a determination is made, using the value, as to whether performance of the first pair of transducers indicates upcoming failure (block 416), and the method ends (block 420).

In the illustrative method, determining whether performance of the first pair of transducers indicates upcoming failure may likewise take many forms. In the case of signal-to-noise ratio as the parameter of interest, the determination may involve determining a difference in signal-to-noise ratio between the tested chord and a signal-to-noise ratio based at least in part on the signal-to-noise ratio of the second electrical signal. In the case of signal amplitude as the parameter of interest, the determination may involve determining a quotient of signal amplitude of the first electrical signal and signal amplitude based at least in part on signal amplitude of the second electrical signal. In the case of noise amplitude as the parameter of interest, the determination may involve determining a quotient of noise amplitude of the first electrical signal and noise amplitude based at least in part on noise amplitude of the second electrical signal.

Figure 5:
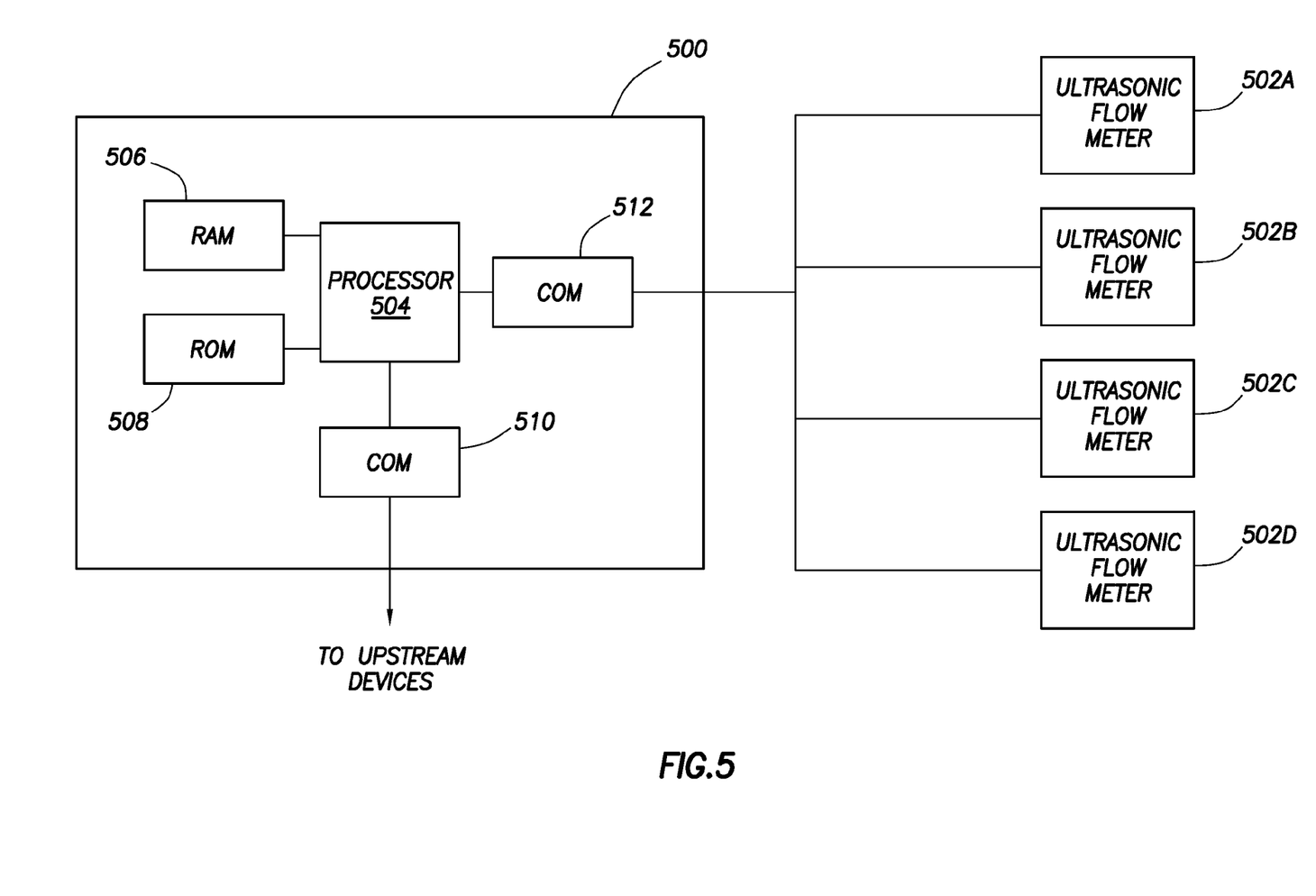
FIG. 5 shows a flow computer in accordance with at least some embodiments.

The discussion of the specification to this point has assumed that determining whether one or more transducers have forthcoming failure takes place in the ultrasonic flow meter. However, in alternative embodiments the determination regarding forthcoming failure may take place in upstream devices. FIG. 5 illustrates alternative embodiments where an upstream device makes the determination as to forthcoming failure. In particular, FIG. 5 illustrates a flow computer 500 coupled to a plurality ultrasonic flow meters 502. The flow computer is configured to accumulate (i.e., maintain a running total) of fluid flow measured by each of the ultrasonic flow meters over a predetermined period of time. Each of the ultrasonic flow meters 502 may be constructed and operated substantially as described above. However, each meter 502 may be a different size (i.e., each spool pieces defines a central passage of a different size), or each meter may measure different types of fluids. For example, a natural gas meter run at a power plant may comprise a plurality of parallel and independent metering sections, each section optimized for particular range of natural gas flow rates. The flow computer 500 may thus accumulate fluid flows from each of the ultrasonic flow meters 502 to establish total natural gas flow into the power plant.

The illustrative flow computer 500 comprises processor 504 coupled to a RAM 506, ROM 508, communication port 510 and communication port 512. The processor 504 is the device within which programs execute to perform the tasks of accumulating flow volume, and also determining forthcoming failure of each transducer pairs in each ultrasonic flow meter 502. The ROM 508 is a non-volatile memory which stores operating system programs, as well as programs to implement the various embodiments. The RAM 506 is the working memory for the processor 504, and before execution some programs and/or data structures may be copied from the ROM 508 to the RAM 504. In alternative embodiments, some programs and data structures may be access directly from the ROM 508. The communication port 510 is the mechanism by which the flow computer 500 communicates with upstream devices, such as a data acquisition system. Likewise, communication port 512 is the mechanism by which the flow computer 500 communicates with the ultrasonic flow meters 502. In alternative embodiments, the flow computer may have an individual communication port 512 for each ultrasonic flow meter 502, and in yet still other embodiments a single communication port may serve to communicate both to the ultrasonic flow meters and the upstream devices. While the processor 504, RAM 506, ROM 508 and communication ports 510, 512 are illustrated as individual devices, in alternative embodiments microcontrollers are used, which microcontrollers integrally comprise a processing core, RAM, ROM and communication ports.

In accordance with these embodiments, at least one of the ultrasonic flow meters 502 is configured to send parameters of acoustic energy received by at least one transducer of the transducer pairs of the ultrasonic flow meter 502. In some cases the parameters sent to the flow computer 500 are electronic representations of the received acoustic energy, and in other cases the parameters sent to the flow computer 500 are merely particular parameters of interest (e.g., signal-to-noise ratio, signal amplitude, noise amplitude). Correspondingly, the flow computer 500, and particularly the processor 504 and communication port 512, is configured to receive the parameters. In accordance the illustrative embodiments, the flow computer 500 is configured to determine whether one or more transducers are subject to forthcoming failure in the manner described above in reference to the ultrasonic flow meter. Thus, if an ultrasonic meter has insufficient computing power to perform the calculations to determine forthcoming failure, the computations may be performed by the flow computer to which the ultrasonic meter couples.

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a computer-readable media for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    creating a first electrical signal representative of acoustic energy propagating between a first pair of transducers of a fluid meter;
    creating a second electrical signal representative of acoustic energy propagating between a second pair of transducers of the fluid meter, the creating the second electrical signal substantially concurrently with creating the first electrical signal;
    calculating a value indicative of a relationship between a parameter of the first electrical signal and a parameter of the second electrical signal; and
    determining whether performance of the first pair of transducers indicates upcoming failure of at least one transducer of the first pair of transducers, the determining using the value.

2. The method of claim 1 further comprising:
    wherein calculating the value further comprises calculating the value to be a difference between a signal-to-noise ratio of the first electrical signal and a signal-to-noise ratio based at least in part on the signal-to-noise ratio of the second electrical signal; and
    wherein the determining further comprises evaluating the value in relation to a predetermined threshold.

3. The method of claim 1 further comprising:
    creating a third electrical signal representative of acoustic energy propagating between a third pair of transducers;
    wherein the calculating further comprises calculating the value to be the difference between the signal-to-noise ratio of the first electrical signal and a largest signal-to-noise ratio of: the signal-to-noise ratio of the first electrical signal; the signal-to-noise ratio of the second electrical signal; or the signal-to-noise ratio of the third electrical signal.

4. The method of claim 1 further comprising:
    wherein the calculating further comprises calculating the value to be a quotient of a parameter proportional to signal amplitude of the first electrical signal and a parameter proportional to the signal amplitude of the second electrical signal; and
    wherein the determining further comprises evaluating value in relation to a predetermined threshold.

5. The method of claim 1 further comprising:
    creating a third electrical signal representative of acoustic energy propagating between a third pair of transducers;
    wherein the calculating further comprises calculating the value to be the quotient a parameter proportional to signal amplitude of the first electrical signal as the denominator and, as the numerator, a parameter proportional to the largest of: the signal amplitude of the first electrical signal; the signal amplitude of second electrical signal; and the signal amplitude of the third electrical signal.

6. The method of claim 1 further comprising:
wherein calculating further comprises calculating the value to be a quotient of a parameter proportional to noise amplitude of the first electrical signal and a parameter proportional to noise amplitude of the second electrical signal; and
wherein the determining comprises evaluating the value in relation to a predetermined threshold.

7. The method of claim 1 further comprising:
creating a third electrical signal representative of acoustic energy propagating between a third pair of transducers;
wherein the calculating further comprises calculating the value to be the quotient of a parameter proportional to noise amplitude of the first electrical signal as the denominator and a parameter proportional to an average noise amplitude of the first second and third electrical signals as the numerator.

8. The method of claim 1 wherein creating the first and second electrical signal further comprises creating the first electrical signal within one second creating the second electrical signal.

9. A system comprising:
a meter body that defines a central passage, the meter body configured to couple to a pipe within which fluid flows;
a plurality of transducer pairs coupled to the meter body;
a processor electrically coupled to the plurality of transducer pairs; and
a memory electrically coupled to the processor, the memory stores a program executable by the processor and the program causes the processor to substantially concurrently obtain, for each pair of transducers of the plurality of transducer pairs, a representation of acoustic energy received by at least one transducer of the transducer pair;
the program further causes the processor to calculate a value indicative of a relationship between a parameter of a first representation associated with a first transducer pair of the plurality of transducer pairs and at least one other representation, and to determine based on the value whether performance of the first transducer pair indicates forthcoming failure.

10. The system of claim 9 further comprising:
when the program causes the processor to calculate the value, the program further causes the processor to calculate the value to be a difference between a signal-to-noise ratio of the first representation and a signal-to-noise ratio based at least in part on a signal-to-noise ratio of at least one other representation; and
when the program causes the processor to determine whether performance of the first transducer pair indicates forthcoming failure the program causes the processor to analyze the value against a predetermined threshold.

11. The system of claim 9 further comprising:
when the program causes the processor to calculate the value, the program causes the processor to calculate the value to be a difference between a signal-to-noise ratio of the first representation and a largest signal-to-noise ratio selected from other representations; and
when the program causes the processor to determine whether performance of the first transducer pair indicates forthcoming failure the program causes the processor to analyze the value against a predetermined threshold.

12. The system of claim 9 further comprising:
when the program causes the processor to calculate the value, the program causes the processor to calculate the value to be a quotient of a parameter proportional to signal amplitude of the first representation and a parameter proportional to a signal amplitude of at least one other representation; and
when the program causes the processor to determine whether performance of the first transducer pair indicates forthcoming failure the program causes the processor analyze the value against a predetermined threshold.

13. The system of claim 9 further comprising:
when the program causes the processor to calculate the value, the program causes the processor to calculate the value to be a quotient of a parameter proportional to signal amplitude of the first representation as the denominator and a parameter proportional to a largest signal amplitude selected from other representations as the numerator; and
when the program causes the processor to determine whether performance of the first transducer pair indicates forthcoming failure the program causes the processor to analyze the value against a predetermined threshold.

14. The system of claim 9 further comprising:
when the program causes the processor to calculate the value, the program causes the processor to calculate the value to be a quotient of a parameter proportional to noise amplitude of the first representation and a parameter proportional to noise amplitude of at least one other representation; and
when the program causes the processor to determine whether performance of the first transducer pair indicates forthcoming failure the program causes the processor to analyze the value against a predetermined threshold.

15. The system of claim 9 further comprising:
when the program causes the processor to calculate the value, the program causes the processor to calculate the value to be a quotient of a parameter proportional to noise amplitude of the first representation as the denominator and a parameter proportional to a largest noise amplitude selected from other representations as the numerator; and
when the program causes the processor to determine whether performance of the first transducer pair indicates forthcoming failure the program causes the processor to analyze the value against a predetermined threshold.

16. The system of claim 9 wherein when the program causes the processor to obtain the representations, the program causes the processor to obtain the representations within one second of each other.

17. A non-transitory computer-readable media that stores a program that, when executed by a processor, causes the processor to: obtain within a measurement period, for each pair of transducers of a plurality of transducer pairs, a parameter indicative of signal-to-noise ratio of acoustic energy received by at least one transducer of the transducer pair; calculate a value being a difference between a parameter for a first transducer pair and a parameter for a second transducer pair; and determine based on the value whether performance of the first transducer pair indicates upcoming failure of at least one transducer of the first transducer pair by evaluating the value in relation to a predetermined threshold.

18. The non-transitory computer-readable media of claim 17 further comprising: when the program causes the processor to calculate the value, the program causes the processor to calculate the value to be the difference between the parameter for the first transducer pair and the second parameter being a largest signal-to-noise ratio selected from transducer pairs other than the first transducer pair.

19. The non-transitory computer-readable media of claim 17 wherein the program causes the processor to obtain the parameters, the program causes the processor to obtain the parameters within one second of each other.

20. A non-transitory computer-readable media that stores a program that, when executed by a processor, causes the processor to: obtain within a measurement period, for each pair of transducers of a plurality of transducer pairs, a parameter proportional to signal amplitude of acoustic energy received by at least one transducer of the transducer pair; calculate a value being a quotient of a parameter for a first transducer pair and a parameter for a second transducer pair; and determine based on the value whether performance of the first transducer pair indicates upcoming failure of at least one transducer of the first transducer pair by evaluating the value in relation to a predetermined threshold.

21. The non-transitory computer-readable media of claim 20 further comprising: when the program causes the processor to calculate the value, the program causes the processor to calculate the value to be the quotient of the parameter for the first transducer pair and the second parameter being proportional to a largest signal amplitude selected from transducer pairs other than the first transducer pair.

22. The non-transitory computer-readable media of claim 20 wherein when the program causes the processor to obtain the parameters, the program causes the processor to obtain the parameters within one second of each other.

23. A non-trasitory computer-readable media stores a program that, when executed by a processor, causes the processor to: obtain within a measurement period, for each pair of transducers of a plurality of transducer pairs, a first parameter proportional to noise amplitude of acoustic energy received by at least one transducer of the transducer pair; calculate a value being a quotient of a parameter for a first transducer pair and a parameter for a second transducer pair; and determine based on the value whether performance of the first transducer pair indicates upcoming failure of at least one transducer of the first transducer pair by evaluating the value in relation to a predetermined threshold.

24. The non-transitory computer-readable media of claim 23 further comprising: when the program causes the processor to calculate the value, the program causes the processor to calculate the value to be the quotient of the parameter for the first transducer pair and the parameter being proportional to a largest noise amplitude selected from transducer pairs other than the first transducer pair.

25. The non-transitory computer-readable media of claim 23 wherein when the program causes the processor to obtain the parameters, the program causes the processor to obtain the parameters within one second of each other.

26. A system comprising:
a processor;
a memory coupled to the processor, the memory stores a program executable by the processor;
a communication port coupled to the processor;
the program causes the processor to receive measured fluid flow values from a fluid meter, the receiving across the communication port, and to maintain a running total of fluid flow through the fluid meter over a predetermined period of time;
the program further causes the processor to obtain across the communication port, and for each pair of transducers of a plurality of transducer pairs of the fluid meter, a parameter of acoustic energy received by at least one transducer of the transducer pair;
the program further causes the processor to calculate a value indicative of a relationship between a first parameter associated with a first transducer pair of the plurality of transducer pairs and at least one other parameter, and to determine based on the value whether performance of the first transducer pair indicates upcoming failure of at least one transducer of the first transducer pair.

27. The system of claim 26 further comprising:
when the program causes the processor to calculate the value, the program causes the processor to calculate the value to be a difference between a parameter being a signal-to-noise ratio of the first representation and a parameter being a signal-to-noise ratio based on at least one other representation; and
when the program causes the processor to determine whether performance of the first transducer pair indicates upcoming failure the program further causes the processor to determine whether the difference is greater than a predetermined threshold.

28. The system of claim 26 further comprising:
when the program causes the processor to calculate the value, the program causes the processor to calculate the value to be a quotient of a parameter proportional to signal amplitude of the first representation as the denominator and a parameter proportional to signal amplitude of at least one other representation as the numerator; and
when the program causes the processor to determine whether performance of the first transducer pair indicates upcoming failure the program further causes the processor to determine whether the value is greater than a predetermined threshold.

29. The system of claim 26 further comprising:
when the program causes the processor to calculate the value, the program causes the processor to calculate the value to be a quotient of a parameter proportional to noise amplitude of the first representation as the denominator and a parameter proportional to noise amplitude of at least one other representation as the numerator; and
when the program causes the processor to determine whether performance of the first transducer pair indicates upcoming failure the program further causes the processor to determine whether the value is greater than a predetermined threshold.

* * * * *